(12) United States Patent
Delany

(10) Patent No.: US 7,313,700 B2
(45) Date of Patent: Dec. 25, 2007

(54) METHOD AND SYSTEM FOR AUTHENTICATING A MESSAGE SENDER USING DOMAIN KEYS

(75) Inventor: Mark Delany, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 507 days.

(21) Appl. No.: 10/805,181

(22) Filed: Mar. 19, 2004

(65) Prior Publication Data
US 2005/0039019 A1 Feb. 17, 2005

Related U.S. Application Data

(63) Continuation-in-part of application No. 10/671,319, filed on Sep. 24, 2003, now Pat. No. 6,986,049.

(60) Provisional application No. 60/553,300, filed on Mar. 15, 2004, provisional application No. 60/497,794, filed on Aug. 26, 2003.

(51) Int. Cl.
H04L 9/00 (2006.01)

(52) U.S. Cl. .............................. 713/176; 726/5; 726/6; 726/7; 713/179; 713/180; 709/217; 709/227

(58) Field of Classification Search ..................... None
See application file for complete search history.

(56) References Cited

U.S. PATENT DOCUMENTS

| | | | | |
|---|---|---|---|---|
| 5,511,122 A * | 4/1996 | Atkinson | ..................... | 713/153 |
| 5,555,309 A * | 9/1996 | Kruys | ........................ | 380/280 |
| 5,757,920 A * | 5/1998 | Misra et al. | ................. | 713/158 |
| 6,119,234 A * | 9/2000 | Aziz et al. | ..................... | 726/11 |
| 6,389,532 B1 * | 5/2002 | Gupta et al. | ................ | 713/163 |
| 6,823,454 B1 * | 11/2004 | Hind et al. | ................. | 713/168 |
| 6,986,037 B1 * | 1/2006 | Assmann | .................... | 713/155 |
| 2004/0083306 A1 * | 4/2004 | Gloe | ......................... | 709/245 |

OTHER PUBLICATIONS

Alt-N Technologies, Ltd., 'MDaemon:DomainKeys Identified Mail', Alt-N Technologies, Ltd., May 17, 2004, entire document, http://www.ebertlang-download.com/alt-n/mdaemon/whitepapers/MDaemon-DKIM.pdf.*

* cited by examiner

Primary Examiner—Nasser Moazzami
Assistant Examiner—Ronald Baum
(74) Attorney, Agent, or Firm—Darby & Darby PC; John W. Branch (57) ABSTRACT

A method and system is directed to providing policies for handling authenticated messages, such as email, and the like, by combining Public Key encryption and the Internet Domain Name System (the "DNS"). The policies include system, user, statistics, new domain, unverified domain, and third party. A domain owner may validate that an email originates from an authorized sender within their domain by using a private key component to digitally sign email outbound from its domain. Employing a public key component, along with a selector, an email recipient may check the validity of the signature, and thus determine that the email originated from a sender authorized by the domain owner. In one embodiment, the public key component used to verify an email signature may be "advertised" or otherwise made available via a TXT record in the DNS.

28 Claims, 8 Drawing Sheets

KEY GENERATION AND LOCATION OF
PUBLIC AND PRIVATE COMPONENTS

FIG. 4

KEY GENERATION AND LOCATION OF
PRIVATE COMPONENTS AT A
PARTICULAR MAIL SERVER

AUTHENTICATION OF SENT MESSAGE

METHOD AND SYSTEM FOR AUTHENTICATING A MESSAGE SENDER USING DOMAIN KEYS

CROSS-REFERENCE TO RELATED APPLICATIONS

This Utility Application is a continuation-in-part of Utility Application Number 10/671,319, which was previously filed on Sep. 24, 2003 now U.S. Pat. No. 6,986,049, Provisional Application No. 60/497,794, which was previously filed on Aug. 26, 2003, and Provisional Application No. 60/553,300, which was previously filed on Mar. 15, 2004, the benefit of the earlier filing dates are hereby claimed under 35 U.S.C. 119(e).

FIELD OF THE INVENTION

The present invention relates generally to data security and more particularly to determining authentication of a message sender.

BACKGROUND OF THE INVENTION

Today, email addresses are trivial to forge. When an email is received with a sender address of, say, yourBigBoss@yourcompany.example.com there is virtually no way to verify that that email actually came from the person authorized to use that sender address.

Spammers take tremendous advantage of this ability to forge and fake email addresses. Forging and faking email addresses is now so rampant that a good number of email system administrators simply block all email from popularly forged domains, e.g., hotmail.com, msn.com, and yahoo.com, because these email administrators have no way of distinguishing real email from forged email.

This sort of haphazard blocking strategy is now widely deployed across the Internet as email administrators desperately try and deal with the rising flood of spam. Unfortunately, these desperation tactics negatively impacts the benefits of email.

However, if a domain owner could irrefutably determine whether an email legitimately originated from the authorized user of a particular email address or not, then recipient email systems can apply filtering and acceptance policies much more rigorously and accurately without much of the negative impact of the current, relatively arbitrary, methods. Thus, it is with respect to these considerations and others that the present invention has been made.

DETAILED DESCRIPTION OF THE INVENTION

In the following detailed description, reference is made to the accompanied drawings in which are shown specific exemplary embodiments of the invention. These embodiments are described in sufficient detail to enable those skilled in the art to practice the invention, and it is understood that other embodiments may be utilized, and other changes may be made, without departing from the spirit or scope of the invention. The following detailed description is, therefore, not to be taken in a limiting sense, and the scope of the invention is defined only by the appended claims.

Throughout the specification, and in the claims, the meaning of "a," "an," and "the" include plural references. The meaning of "in" includes "in" and "on." Additionally, a reference to the singular includes a reference to the plural unless otherwise stated or inconsistent with the disclosure.

The term "domain owner" includes a representative or delegated system, and the like, that is authorized to administer an internet domain name, known also as "the domain" in the Internet Domain Name System (the "DNS").

The terms "email administrator," "message administrator," and "administrator," include a representative or delegated system, and the like, that receives a message, such as an email.

The term "sender address" includes a message address, such as an email address, employed in the message to identify the sender of that message. This is typically, but not necessarily, the contents of the first "From:" header line in the message. Sender address also applies generically to a claimed message address of the sender, however identified.

Briefly stated, the present invention includes a method and system for verifying that a message, e.g., an email, instant message, short message service (SMS) message, multi-media service (MMS) message, and the like, actually originated from a particular domain identified in the sender's "From" address. One embodiment of the invention employs Public/Private key encryption to securely authenticate the origination of the message from a particular domain that corresponds to the sender address. Another embodiment of the invention could employ root keys such as provided by a Certificate Authority, and the like, to authenticate the origination of a message from a particular domain. The invention generally employs any of several different types of key encryption methods that enable a domain owner to provide proof of origination to recipient messaging systems which in turn enables message administrators, and the like, to distinguish forged or "spoofed" sender addresses from legitimate sender addresses.

When a message claims to have been sent by a certain sender address, the invention enables a receiving messaging system to determine whether that email and its contents, did in fact originate from a valid domain that has authorized the use of that sender's address for messaging. While a DNS can be the primary mechanism for publishing and retrieving public keys, the invention can support other key services in addition to the DNS.

The authentication provided by the invention can be employed in a number of scenarios in which other email authentication systems can fail, including, but not limited to, forwarded email, distributed sending systems, roving users, mailing lists, out-sourcing of email services, and the like. In addition to this, the invention can be superior to hierarchical Public Key systems as it places key management, including key revocation, in the direct control of the owner of a domain.

A Domain Key application for implementing the invention can be installed at a client, mail server, or both, depending on the configuration of a particular messaging system. Also, since the invention validates a domain as the origination of a message (not the actual identity of the sender) to the receiver, a messaging system that employs the invention can still provide relatively anonymous messaging services to its customers.

To enable the operation of the invention, relevant information is typically inserted into the header of a message. In this way, messaging issues associated with the forwarding of messages and/or attachments are reduced.

Figure 1:
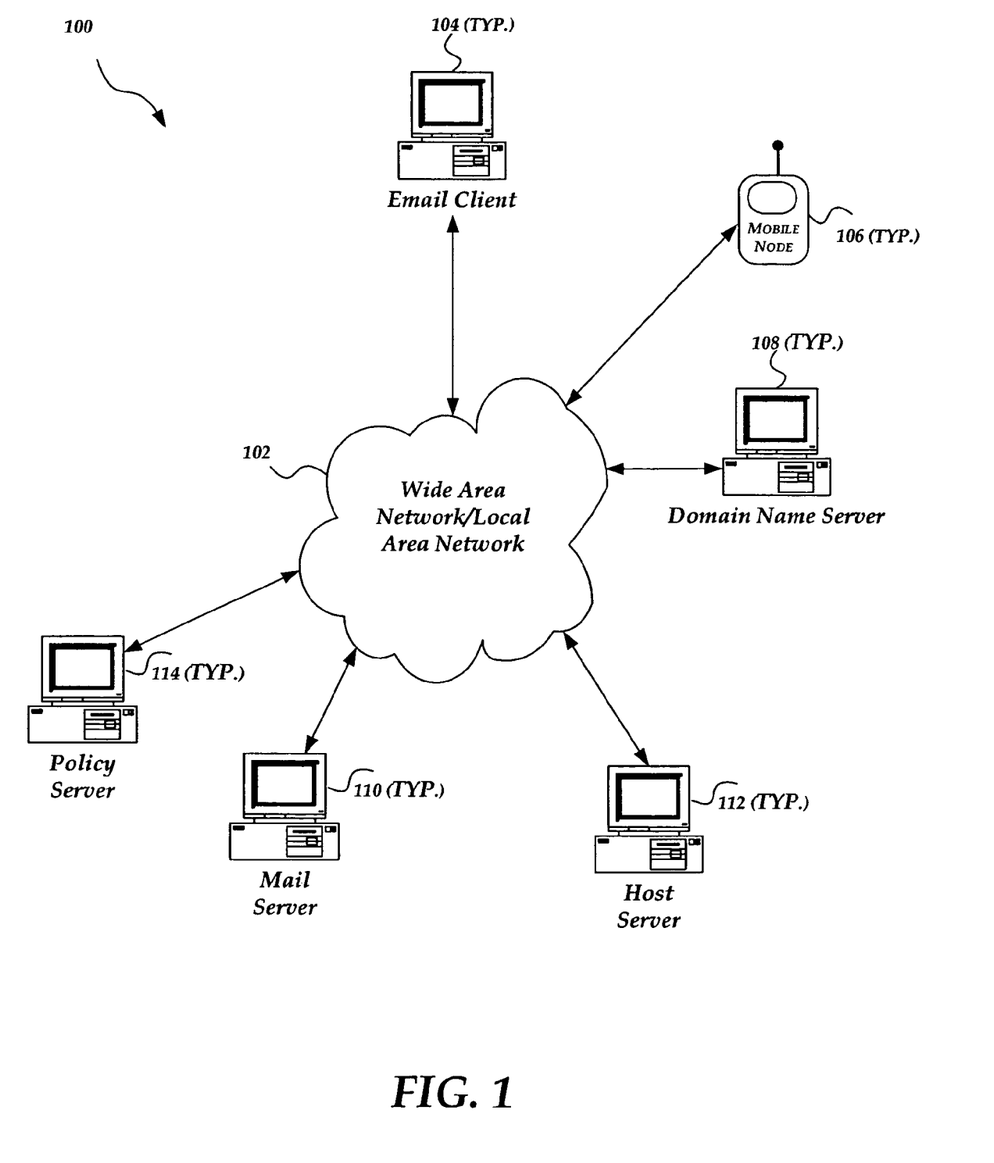
FIG. 1 illustrates an overview of an exemplary network.

FIG. 1 illustrates an overview 100 of an exemplary environment in which the invention operates and in which multiple mail clients 104 can be in communication with at least one Mail server 110, one Policy server 114 and at least one Domain Name System (DNS) server 108 over network 102. Although FIG. 1 refers to mail client 104 as an exemplary client device, other types of client devices may be employed with the invention. For example, multiprocessor systems, microprocessor-based or programmable consumer electronics, network PCs, PDAs, wearable computers, and the like. These client devices may also include devices that typically connect to network 100 using a wireless communications medium, e.g., mobile nodes 106, smart phones, pagers, walkie talkies, radio frequency (RF) devices, infrared (IR) devices, integrated devices combining one or more of the preceding devices, and the like.

Generalized Operation of Domain Key Application

Public Key cryptography is a general mechanism which includes a series of mathematical operations applied in conjunction with at least two components: a private key component and a public key component. The private key component is typically kept secret by the owner of those keys and can be used to create a digital signature of any data. The public key component may be made available to the public who can use it to verify that the digital signature was created using the corresponding private key component.

While there are numerous Public Key algorithms available (RSA for example), virtually any Public Key algorithms may be implemented to do at least the following: (a) Generate a Public Key component and the corresponding Private Key component, called "key generation," to produce a "key pair"; (b) Given the Private Key component and some data, generate a digital signature, known as "signing"; and (c) Given a digital signature, the same data and a Public Key component, may be employed to determine if that signature was generated with the same data and corresponding Private Key component. These steps are often employed to "verify" the authenticity of a digital signature.

The inventive Domain Key application may use Public Key cryptography as follows. A domain owner can prove that an email originated from an authorized user within their domain by using the private key component to digitally sign each outbound email. Using the public key component, the recipient system can check the validity of the digital signature accompanying the incoming email and thus prove (authenticate and verify) that the email actually originated from a sender address authorized by the domain owner.

Typically, a Public Key infrastructure includes the HTTPS protocol which operates in conjunction with the Secure Sockets layer (SSL) interface. Although HTTPS in particular and SSL in general exist as a hierarchy that starts with root Certificate Authorities, there is no need for the public key components to be implemented or distributed in substantially this way for the present invention. Rather, the public key component used to verify an email signature may be "advertised" or otherwise made available via a text (TXT) record, which are often stored in the DNS for other reasons. In one example, the public key for the domain "example.com" could be retrieved with a Unix 'dig' command, such as "dig selector._smtp._domainkey.example.com txt".

Figure 2:
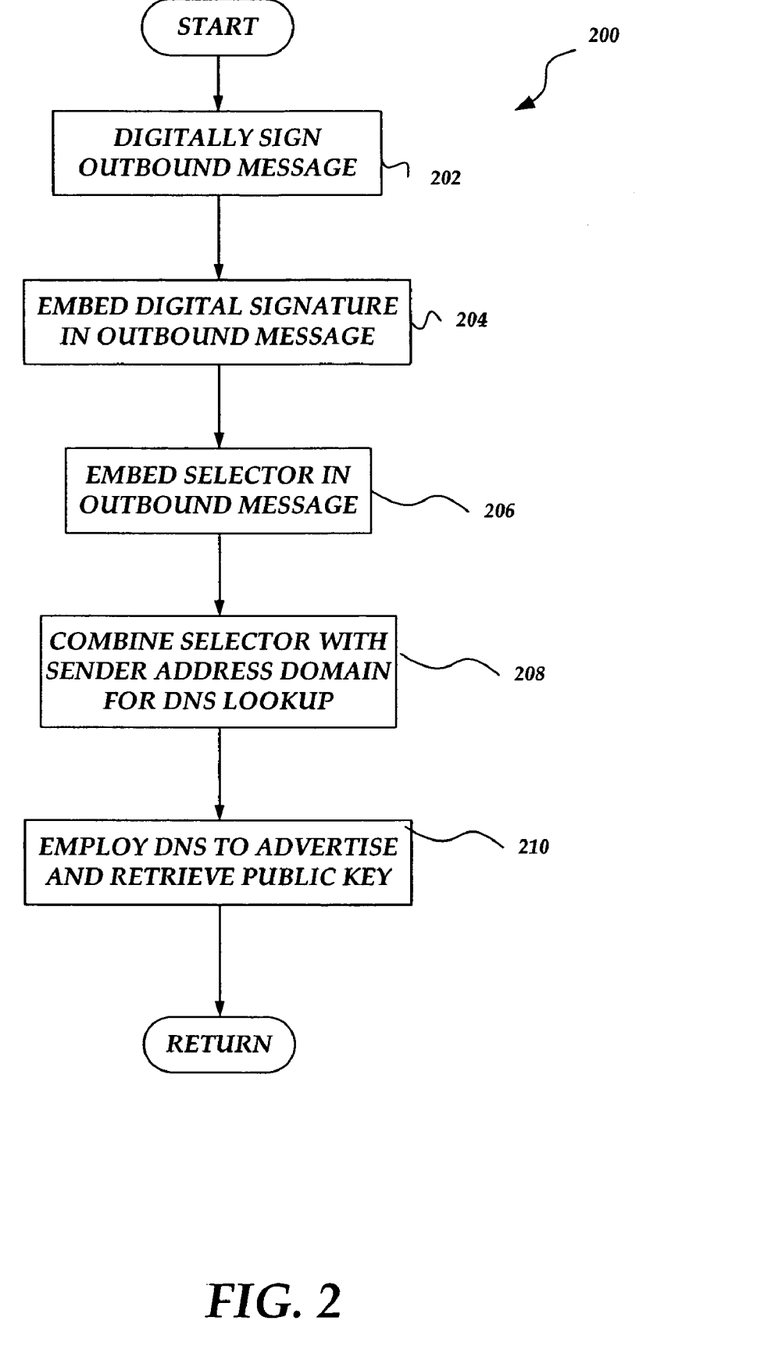
FIG. 2 shows a flow chart for sending an outbound message.

FIG. 2 generally illustrates a process for sending an outbound message, such as an email. Moving from a start block, the process advances to block 202 where an outbound message is digitally signed. At block 204, the digital signature is embedded in the outbound message. At block 206, a Domain Key "selector" is embedded in the outbound message which can be employed for the receipt and authentication of the message. At block 208, the "selector" is combined with the sender address domain to form the DNS lookup query to retrieve the Public Key. Next, at block 210, the DNS infrastructure can be used to advertise and retrieve the Public Key.

Blocks 206, 208 and 210, above introduce the notion of a "selector" which provides substantial flexibility, particularly for large and diverse installations, for rapid revocation and replacement of public keys and for the issuance of public keys to an authorized subset of users within that domain.

There are many advantages to the inventive Domain Key application over other message authentication systems. Some of these advantages may include:

(a) the Domain Key application can handle the forwarding case whereas a proposal like the "Designated Sender" discussed above and RMX typically do not;

(b) Advertising of Public Keys in the DNS reduces the barriers to entry as opposed to a Certificate Authority approach used by SSL. Previously, each domain holder was obliged to pay an annual fee for each certificate handled by a Certificate Authority, and the like;

(c) the Domain Key application can be transparent and compatible with many existing message infrastructures;

(d) the Domain Key application can be implemented independently of clients, thus time to deployment is shorter; and (e) the introduction of a "selector" as a public key component differentiator creates much greater flexibility.

Figure 3:
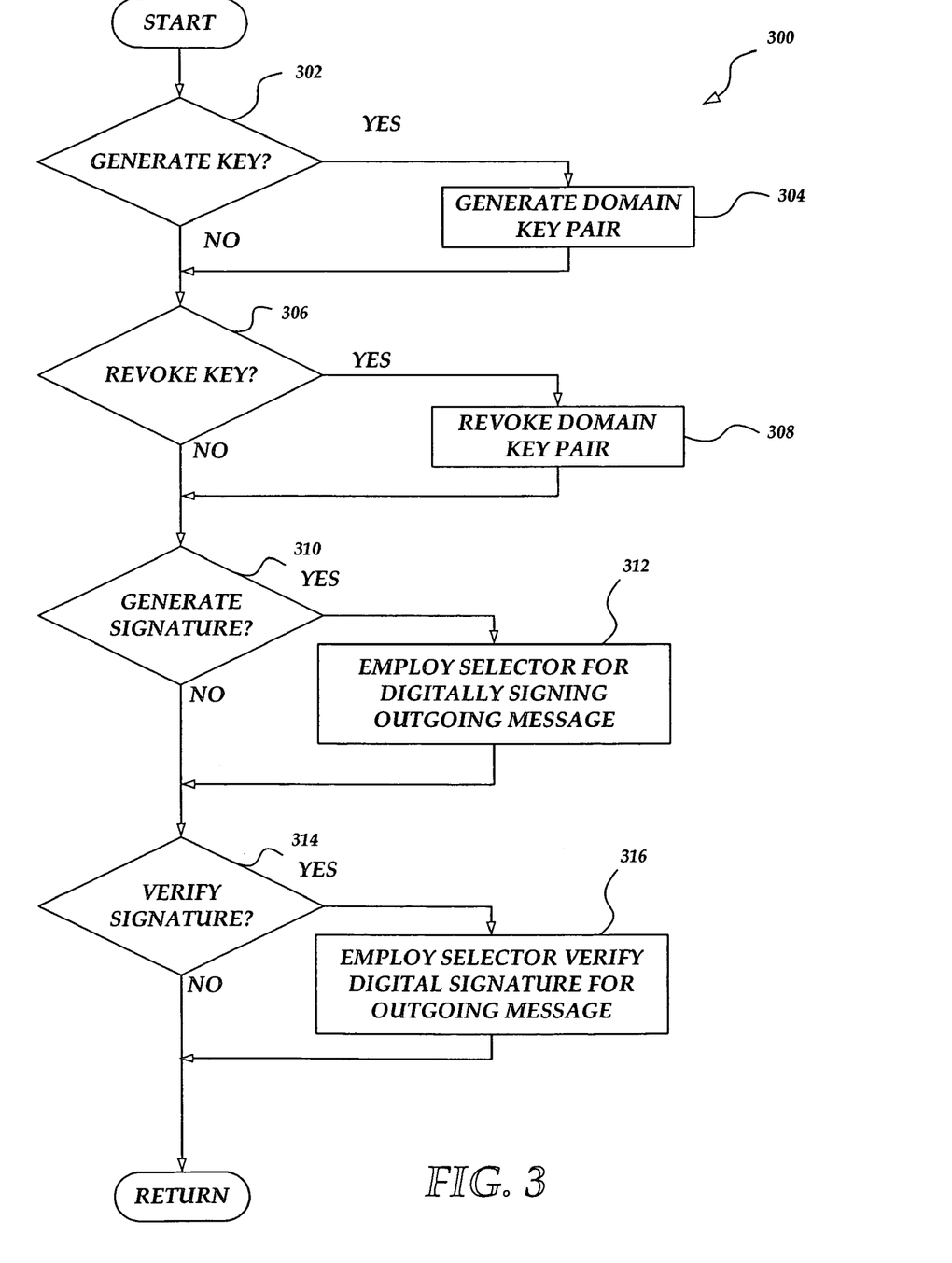
FIG. 3 illustrates a flow chart for several processes that can be performed with the a domain key pair.

FIG. 3 generally illustrates a flow chart of an overview of several processes that can be performed by the inventive Domain Key application. Moving from a start block, the process advances to decision block 302 where a determination is made as to whether or not a domain key pair is to be generated. If true, the process flows to block 304 where the domain key pair is generated. The generation of the domain key pair is discussed in greater detail below. From block 304 or if there was a negative determination at block 302, the process steps to decision block 306 where another determination is made as to whether or not a domain key pair is to be revoked.

If the domain key pair is to be revoked, the process moves to block 308 where this operation is performed. The revocation of a domain key pair is discussed in greater detail below. From block 308 or if there was a negative determination at block 306, the process moves to decision block 310. At decision block 310, a determination is made as to whether or not an outgoing message will be signed. If true, the process moves to block 312 where a selector and corresponding private key component is employed in the operation of digitally signing the outgoing message. Greater detail regarding the operational steps for digital signing an outgoing message is presented below in the specification.

From block 312 or if there was a negative determination at block 310, the process moves to decision block 314. At decision block 314, a determination is made as to whether or not a digitally signed outgoing message is to be verified. If true, the process moves to block 316 where a selector is employed to identify the particular public key used to verify the digital signature of the outgoing message. Greater detail regarding verification is presented below. Next, from block 316 or if there was a negative determination at block 314, the process moves to a return block where the process returns to performing other actions.

The following discussion illustrates in greater detail the inventive processes discussed in FIG. 3 for key generation, key revocation, and signature generation, and signature verification.

Key Generation

The Domain Key application is not limited to one particular Public/Private Key mechanism, rather it can employ the basic operations and components generally made available by almost all Public/Private Key algorithms.

In the Domain Key application, each domain key pair generated for a given domain is associated with a unique "selector". The choice of selector values is a local matter, so long as the value can be advertised in the particular key service such as the DNS, and the like, and can safely be added as a part of a message header.

The private key component, along with the corresponding selector can be made available to outgoing mail servers in whatever form suits that implementation. Typically, a data file of some sort could contain this information, but the invention is not so limited.

The corresponding public key component may be rendered into base64, and the like, and advertised in the DNS as a TXT record, or the like, with a name such as:

$selector._smtp._domainkey.$domain

Where $selector may be replaced with the actual value of the selector.

Where the string "_smtp._domainkey." is an address node to be reserved in the DNS for the Domain Key system, and $domain is an actual domain name.

Key Revocation

In one embodiment, the corresponding DNS TXT record, and the like, may be removed from the DNS. Reliance may be made on an intrinsic expiration of DNS data via a time-to-live mechanism (TTL). However, there is no reason that the key revocation has to be permanent. Instead, it could be made available or not, as needs arise, simply by removing or adding the corresponding DNS TXT record, and the like.

Digital Signature Generation:

One embodiment of digital signature generation generally occurs as follows:

(1) If the signing agent detects an existing signature header, the message is passed through, or a local policy may be applied. That is, any action may be entirely a matter of the local system and not constrained by the present invention. In other words if a message appears to be signed, the invention need not attempt to sign it a subsequent time.

(2) Scan the headers to determine the sender address. First look at the first occurrence of the "From:" line and extract the domain from the message address. If no domain name can be extracted, examine the first occurrence of the "Sender:" line and extract the domain name from the message address. If no domain name can be extracted, use the domain name of the envelope sender. The extracted domain is called the "from domain". If no "from domain" can be found, then the message is not signed.

(3) If the message server does not have the private key for the "from domain", apply local policy.

(4) Normalize the contents of the message prior to digital signature generation:

(a) Regardless of the local convention for line endings, all relevant header and contents lines may be signed as if the line ending is CRLF (ASCII Carriage Return, Line Feed).

(b) If the last line of the message does not end in a line terminator, or the like, append one to the end of the message. This enables protection against intervening message servers doing this.

(c) If the message ends with multiple empty lines, and the like, ignore all but the first of these multiple line terminators when calculating signatures.

(5) Using the "from domain" and a selected selector to identify the particular private key, generate the digital signature based on the set of header lines, the separating line and all content lines, including line termination characters, and the like.

(6) Convert the digital signature to base64, or the like, so that it can be sent through an SMTP network, and the like.

(7) Generate the "Domain Key-Signature:" header line. In one embodiment, the header line includes:

(a) The string "Domain Key-Signature:"

(b) The signature type and version may include alphanumeric, '-' and '.'. In one embodiment, the digital signature type and version and is no more than 32 characters long. However the invention is not so limited and other lengths may be employed without departing from the scope of the present invention.

(c) a colon,

(d) a selector. In one embodiment, the selector is 32 characters long.

(e) a colon, and

(f) The digital signature in base64, or the like, encoding.

Typically this line will be header wrapped as, apparently, some message programs cannot cope with header lines longer than 80 bytes.

(8) Prepend the "Domain Key-Signature:" header line to the message.

Digital Signature Verification

To enhance the effectiveness of revocation, the validity of a digital signature for the inventive Domain Key application may be ephemeral. That is, the signing domain vouches for this digital signature for the duration of delivery, and need not vouch for any time period subsequent to that. Consequently, digital signatures may be checked on final delivery rather than subsequent to final delivery.

One embodiment of a process for verifying a digital signature includes:

(1) Scanning a message for the first occurrence of the "Domain Key-Signature:" header. While doing so, occurrences of "Domain Key-Status:" header status lines may be removed or modified such that they are no longer present as that header name.

(2) Extract the signature type, version and signature value from the "Domain Key-Signature:" header.

(3) If the signature type or version are not recognized, apply local policy.

(4) Extract the "from domain" from the message in substantially the same way as defined by the signing process.

(5) If no "from domain" is found, apply the local policy.

(6) Query for the public key component based on the signature type, selector, the "from domain," and the like. In the case of the DNS, the query may be of the form of a TXT record for the name $selector._smtp._domainkey.$fromdomain, or the like.

(7) If the query fails to respond, defer acceptance of this message.

(8) If the query fails because the record does not exist, apply the local policy.

As an interim until widely adopted, the Domain Key application can use a place-holder DNS entry at the _smtp._domainkey.node which indicates whether that particular domain is participating in the Domain Key application or not. The presence of the place-holder indicates participation while the absence of the place-holder indicates non-participation.

(9) Using the public key component returned from the query, check the signature against the entire contents of the email following the "DomainKey-Signature: "header line. Again, the contents are canonically treated in exactly the same way as they are in the signing process.

(10) If the digital signature fails, apply local policy.

(11) In all cases where the message is accepted for delivery, local policy may be conveyed to the message client via a "DomainKey-Status:" header line that precedes the DomainKey-Signature:" header line.

EXAMPLES

The following example for the Domain Key application is intended to introduce at least one embodiment of the present invention and illustrate how its concepts may be integrated into a flow of email.

Email Composed by User
   From: "Joe SixPack"<joe@football.example.com>
   To: "Suzie Q"<suzie@shopping.example.net>
   Subject: Is dinner ready?
   Date: Fri, 11 Jul. 2003 21:00:37-0700 (PDT)
   Message-ID:
      <20030712040037.46341.5F8J@football.example.com>
   Hi.
   We lost the game. Are you hungry yet?
   Joe.

Nothing about the email authorship process is changed by the Domain Key application. In some implementations it is expected that the sender may have no need to know that the Domain Key application exists.

Email Signed by Sending Email Server

Using the private key component, this email is signed by the example.com outbound mail server and now looks something like this:
   DomainKey-Signature:
     sigs-0.50:D8CD98F00B204E98:
       AMLfamjh4GrUzSN5BeUC13qwlq/hL6    GOk8M/
       1UNjSRruBNmRugCQoX7/
       mHSbSF5Dimr5ey1K6MZg0XclZucPW/s9UWm/
       mxqWP    5uD42B6G+MbSicsj/2obMIBIQjNzRX7A
       19rOUi4NFzjDVtO74vgMlMJepyJR3NOqPm8zGe+g
       XhcNBbCuxE0T2keDkJQP8ZJt1WL+
       t6IhbTX3vWxtK0CtjaXYCxVJ5IoyroMxfpdwU6dolfEa
       bodyC1Tu+9xvOfHVK+JK7rz+
       wwbvRrxiLfrYigYTm4TQ9v1HkW9nt9/7aLw/rN2Fs/
       kGwKM        ZwxQ9ypgi9qOpNX/TAceElOp8+
       jAXW70R7pZYzdrNTq0/IfZu76nq6YnQux7
   Received:  from   dsl-10.2.3.4.network.example.com
     [10.2.3.4] by submitserver.example.com with SUBMISSION;
   Fri, 11 Jul. 2003 21:01:54-0700 (PDT)
   From: "Joe SixPack"<joe@football.example.com>
   To: "Suzie Q"<suzie@shopping.example.net>
   Subject: Is dinner ready?
   Date: Fri, 11 Jul. 2003 21:00:37-0700 (PDT)
   Message-ID:   <20030712040037.46341.5F8J@football.example.com>
   Hi.
   .etc Here we can see that additional header lines have been added to this email. Of particular interest are the contents of the "DomainKey-Signature:" line, which has three colon separated components:

(1) A digital signature type and version—in this case "sigs-0.50". This defines which algorithm is used to check the signature. It also defines the location and form of the query used to retrieve the corresponding Public Key.

(2) The Domain Key Selector—in this case "D8CD98F00B204E98". This selector is used to form a query for the Public Key. It is understood that a selector can be provided by which multiple Public Keys for a single domain name might co-exist.

(3) The digital signature data encoded as a base64 string—in this case the string starting with "AMLfamjh4GrUzSN". This is the output of the digital signature generation process.

White spaces are typically ignored in this header and may be removed when using the components to verify the email. The signature typically applies to every line following the first "DomainKey-Signature:" header line.

Note that as some email systems re-write headers, it may be appropriate to sign a canonical form of vulnerable headers and sign a specific subset of header.

Authentication of Email by Receiving Email Server

For an email, the digital signature is normally authenticated by the final delivery agent. However, intervening mail servers may also perform this authentication if they choose to do so.

One embodiment of a process for authentication includes the following steps:

(1) The selector and digital signature are extracted from the "DomainKey-Signature:" header line.

(2) The domain is extracted from the sender address. This is the contents of the first "From:" header. If no domain can be extracted, then extract from the first "Sender:" header line. If no domain can be extracted then the domain is extracted from the envelope sender.

(3) The DNS is queried for a TXT record associated with the following name:
   D8CD98F00B204E98._smtp._domainkey.example.com Note that the selector "D8CD98F00B204E98" forms part of the DNS query as part of the Domain Key process.

(4) The returned TXT record includes the base64, or the like, encoded Public Key for that selector/domain combination. This Public Key may be used to authenticate the digital signature according to the Signature type and version algorithm.

(5) If no TXT record exists, the digital signature is a forgery or this Domain key pair has been revoked by the domain owner.

(6) Policy is typically applied to the email depending on:
  (a) the presence of a DomainKey-Signature: header
  (b) the results of the Public Key lookup
  (c) the results of the digital signature verification
  (d) Assuming the digital signature is valid, this knowledge is communicated to the UA via the "DomainKey-Status: good" header line which is prepended to the email.

Selectors

Selectors enable flexibility in the inventive Domain Key application. A domain owner is free to use a single selector for all out-bound mail. They may also use many uniquely selected domain key pairs and assign each domain key pair and selector to different users, different groups of users or different mail servers. For example:

(1) A large outbound mail farm of, say, 200 servers might each have their own selector and domain key pair. Thus, their DNS could advertise all 200 public key components via their unique selectors.

(2) A corporate mail administrator might generate a unique selector and domain key pair for each regional office mail server. Their DNS might advertise one public key component for each regional office.

(3) Roving users who are obliged to use untrusted or unknown mail servers (such as their hotel mail server when traveling) can be issued personal domain keys that can be used to digitally sign email prior to submission to the untrusted mail server. Again, the selector ensures that any number or combination of domain keys can be issued and removed at any time.

Whilst management of domain key pairs may be entirely a local matter for each domain owner, there are other methods to assist a domain owner to gain the maximum benefit of the Domain Key application. However, such methods are not intended to limit or constrain the present invention.

Key Management at Local Servers (1) Generate new server-wide domain key pairs on a regular basis.
(2) Allow old keys to exist in the DNS for an overlapping period of at least seven days after the latest key is in use.
(3) Use a modest TTL so that key revocation can be rapidly achieved by the simple expedient of removing that RR from the relevant zone.

Key Management with Third Parties

Some domain owners may need to out-source their e-marketing to a specialist company. In this case, uniquely selected domain keys can be generated by the domain owner and its private key component can be supplied to the e-marketing company which uses that private key component to sign the outbound mail on behalf of the domain owner. On completion of the out-sourcing project, the domain owner simply removes that selector's domain key from their DNS at which point subsequent email signed with the original private key component will fail the digital signature test.

Compromised Key

Key compromise means that the private key component has, or is, being used without authorization. One remedy may be to revoke that particular key pair by removing the public component from the DNS.

Designated Sender and RMX

Designated Sender and RMX likewise address the concept of identifying valid sources of email for a given domain. Both of these schemes may be simpler to implement as they use the DNS to advertise fixed addresses of valid sending email servers. These fixed addresses are amenable to an RBL-type lookup mechanism that is built into many mail servers. It also requires no cryptographic analysis.

However, both schemes fail to cater for forwarded mail which can be a huge problem, as forwarding is a very popular part of the email system. Consider alumni-type forward services, commercial forwarding services such as pobox.com and professional forwarding services such as ieee.org. All of these would likely fail Designated Sender and RMX tests, whereas the inventive Domain Key application would not.

Certificate Authority (CA) Approach

A CA approach means that every key may cost money. Currently that may be of the order of $100 per year per domain. That's a huge cost given that, today, there are some 1,000,000+ domains on the planet, and growing. Due to this cost barrier, the CA approach is unlikely to be adopted by most domain owners. Conversely, domain keys are virtually free and are just as secure, if not more so, and can be readily adopted by domain owners with virtually zero on-going cost.

A huge problem with the traditional CA approach is that there is no simplistic revocation system in place. If a key is compromised there is no way to tell the rest of the world that there is a replacement key and that the old key can no longer be trusted. With a DNS approach you simple generate a new key and change your DNS entry. Within the TTL of your DNS (typically a day or so) your old key is irrelevant and invalid.

Advertising Public Keys

As alluded to earlier, in one embodiment the inventive Domain Key application uses the DNS to advertise public key components, as it provides an excellent authority for a given domain. For example, only joesixpack.com would be able to create an entry for _domainkey.joesixpack.com.

Additionally, DNS is an existing infrastructure that is known to work well and will easily handle the load. In fact, the total DNS load may reduce as reverse queries may well not be needed with the Domain Key application and a reverse query is more costly and less cacheable than a DomainKey message.

DNS is also efficient. A 2048 bit public key comfortably fits inside the 512 maximum size of a UDP packet for DNS.

Finally, the inventive Domain Key application is not constrained to using the DNS. A separate key server infrastructure is entirely possible as indicated by the key type and version in the DomainKey-Signature: header.

Using the DNS could present a security risk because the DNS itself is currently vulnerable. However, the sorts of attacks possible on the DNS are typically costly compared to the rewards of forging a Domain Key digital signature. Also, since the Domain Key application is used to prove that the sender of the email has the authority to use a particular From: email address, verification of that email's content is beyond its purpose, and more cautious users might want to protect content with other third party encryption technology, such as Pretty Good Privacy (PGP), and the like.

Figure 4:
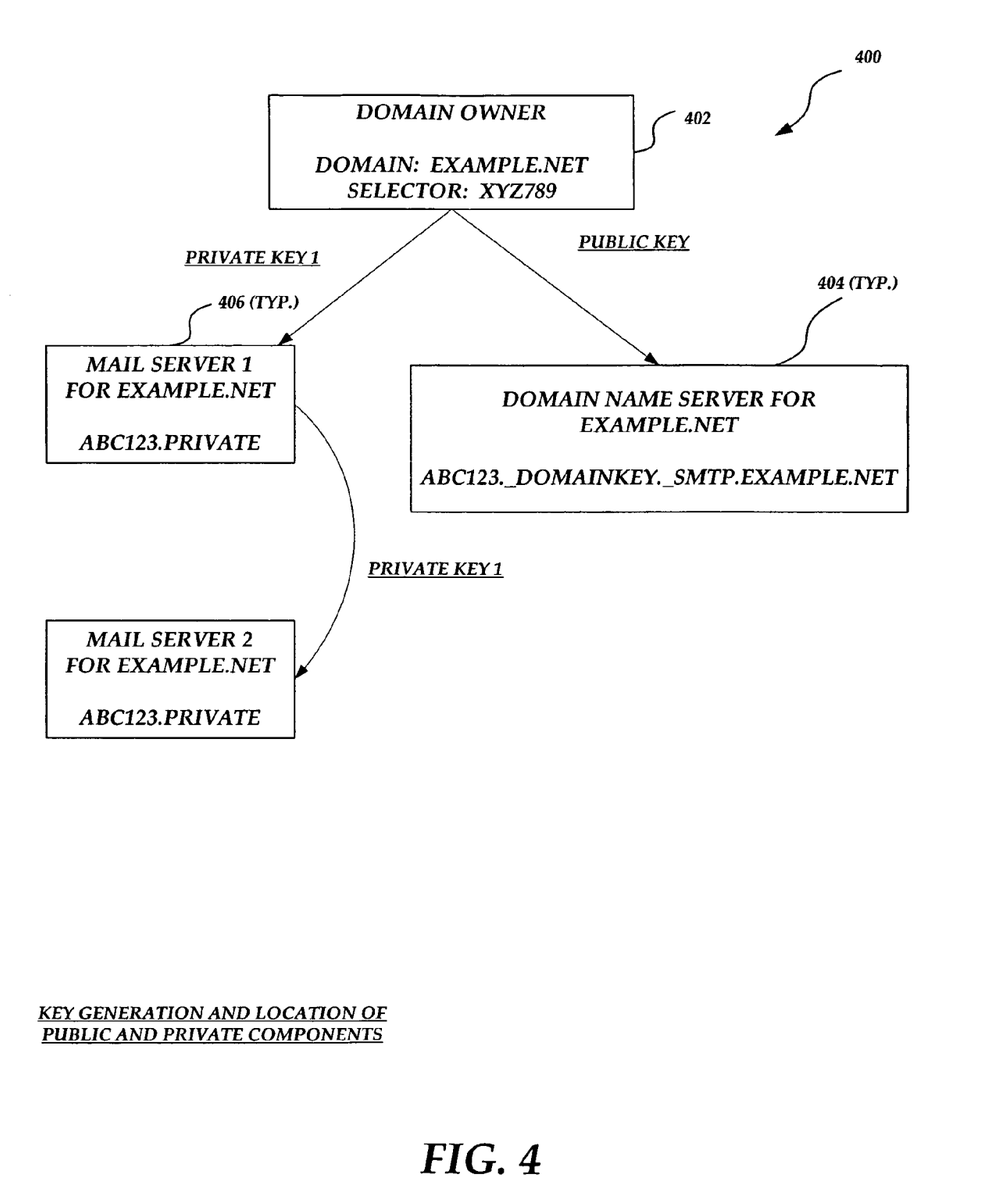
FIG. 4 shows a flow chart for generating a domain key pair and distributing the private key components to every mail server associated with the domain.

FIG. 4 illustrates an overview 400 of the process flow for generating a domain key pair and distributing the private key components to every messaging (mail) server associated with the domain. As shown in block 402, the owner of a domain e.g., example.net, generates the key pair for the domain and a selector (ABC 123). The domain owner distributes the private key with the selector to each mail server 406 associated with the domain. Also, the domain owner distributes the public key component of the domain key pair to each DNS 404 that is employable to resolve a request for the domain. The selector is employed to store and identify the public key in a TXT record for the DNS.

Figure 5:
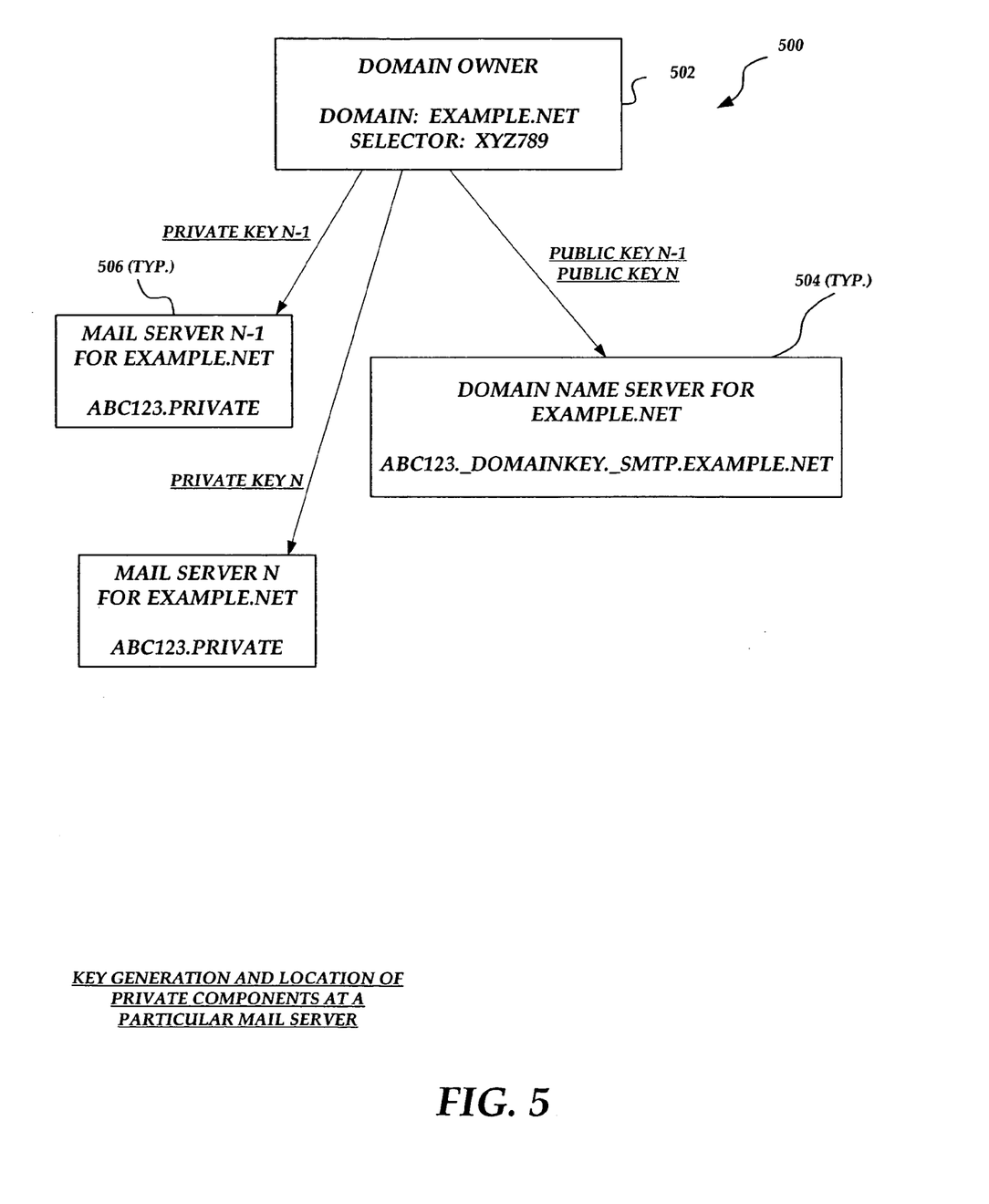
FIG. 5 illustrates a flow chart for enabling a domain owner to generate multiple domain key pairs for an individual sender or a group of senders and distribute the private key component.

FIG. 5 illustrates an overview 500 of the process flow for enabling a domain owner to generate multiple domain key pairs for an individual sender or a group of senders and distribute the private key components to a particular mail server associated with the domain. As shown in block 502, the owner of the domain generates multiple domain key pairs. All of the public key components are distributed to each DNS 504 that is employable to resolve a request for the domain. However, the private key components for the separate domain key pairs are distributed to a particular mail server that is associated with the domain. In this way, domain key pairs can be generated for handling by a particular mail server that is geographically close to the sender of a message.

The invention enables management of domain key pairs for an individual sender or a group. In particular, multiple domain key pairs can be employed where it is anticipated that a messaging service will be revoked for at least an individual sender or group of senders in the foreseeable future.

Figure 6A:
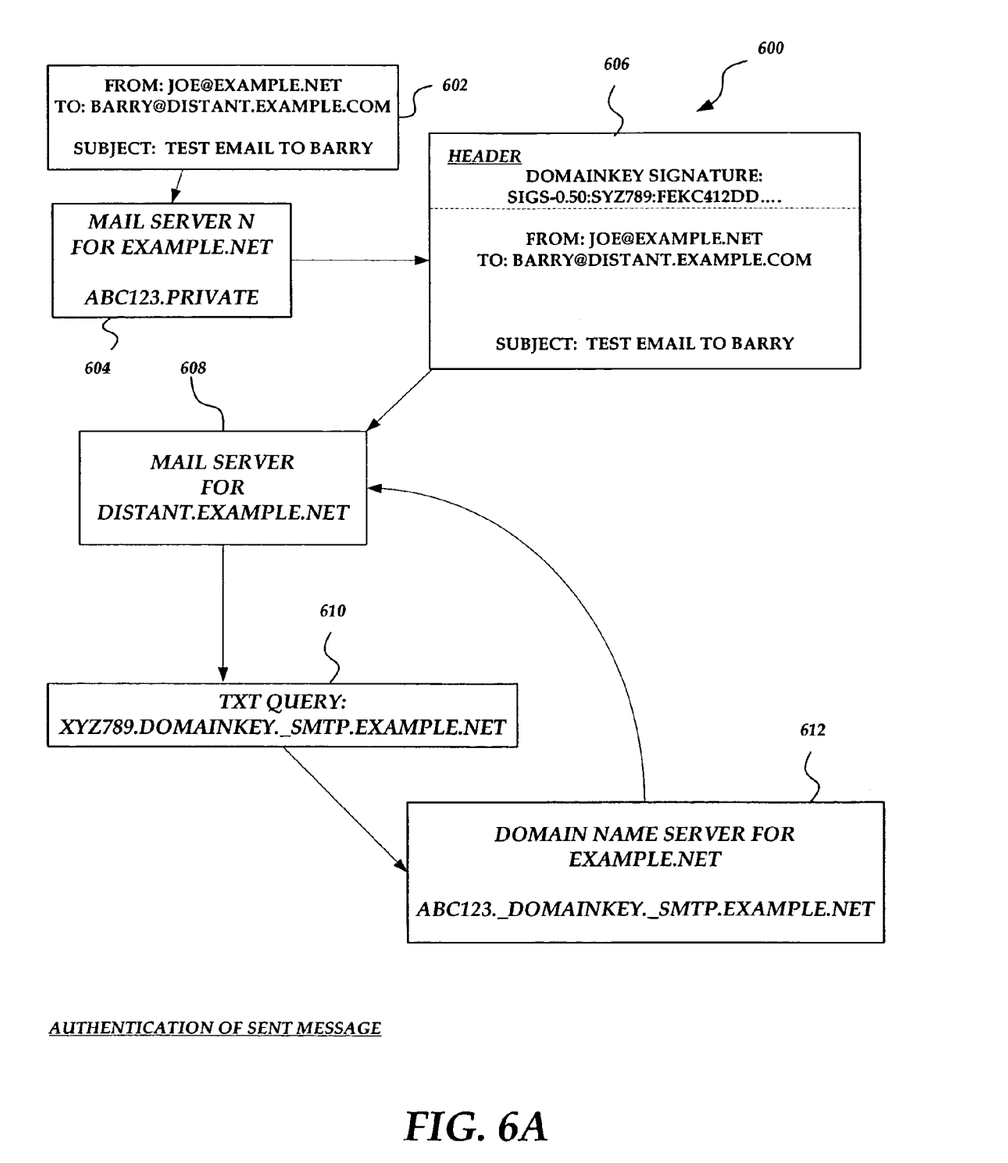
FIGS. 6A and 6B show a flow chart for authenticating the domain of origination for a message and providing an authenticated message to the mail box of the recipient.
Figure 6B:
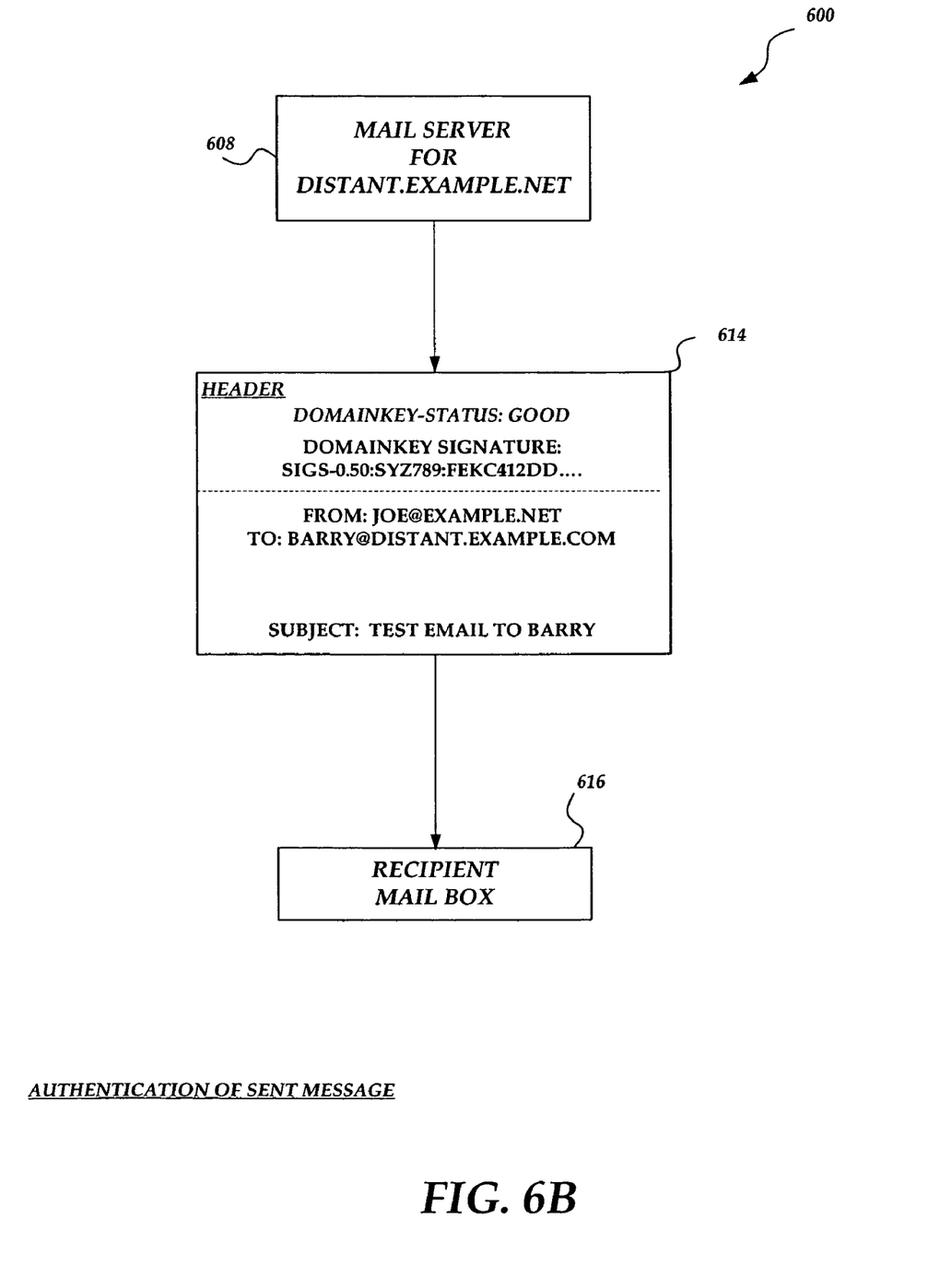

FIGS. 6A and 6B illustrate an overview 600 of the process flow for authenticating the domain of origination for a message and providing an authenticated message to the mail box of the recipient. A message 602 is generated by the sender and provided to mail server 604 for the domain associated with the sender's address. Mail server 604 confirms that the sender is authorized to send a message from the domain. If the sender is authorized, mail server 604 digitally signs the message and inserts the signature in the header of the message. The digitally signed message 606 is forwarded to another mail server 608 which is associated with the domain of the recipient. Next, the other mail server 608 sends a TXT query to DNS 612 which is associated with the domain. The TXT query includes a selector for identifying the public components of the domain key pair. If found, DNS 612 provides the public components to the other mail server 608 to be used to verify the domain as the origination of the message.

Finally, as shown in FIG. 6B, once the domain is verified by the other mail server 608, this server inserts a "good" status in the header of the digitally signed message 614, which is then forwarded to the recipient's mail box 616.

Domain Policy

Once the domain is (or is not) verified, there are different types of policies and/or rules that can be provided by rules engines and/or policy servers for the further handling of messages by message systems. For example, as shown in FIG. 1, policy server(s) 114 can be arranged in a network to provide policies/rules that are employed in the handling of messages by mail server(s) 110. These policies/rules can include, but are not limited to, system wide, user, statistics, third party, new domain, and unverified domain. Although not shown rules engines and/or policy servers can also be configured to operate with mail servers on an intranet that is not directly coupled to an external network.

Figure 7:
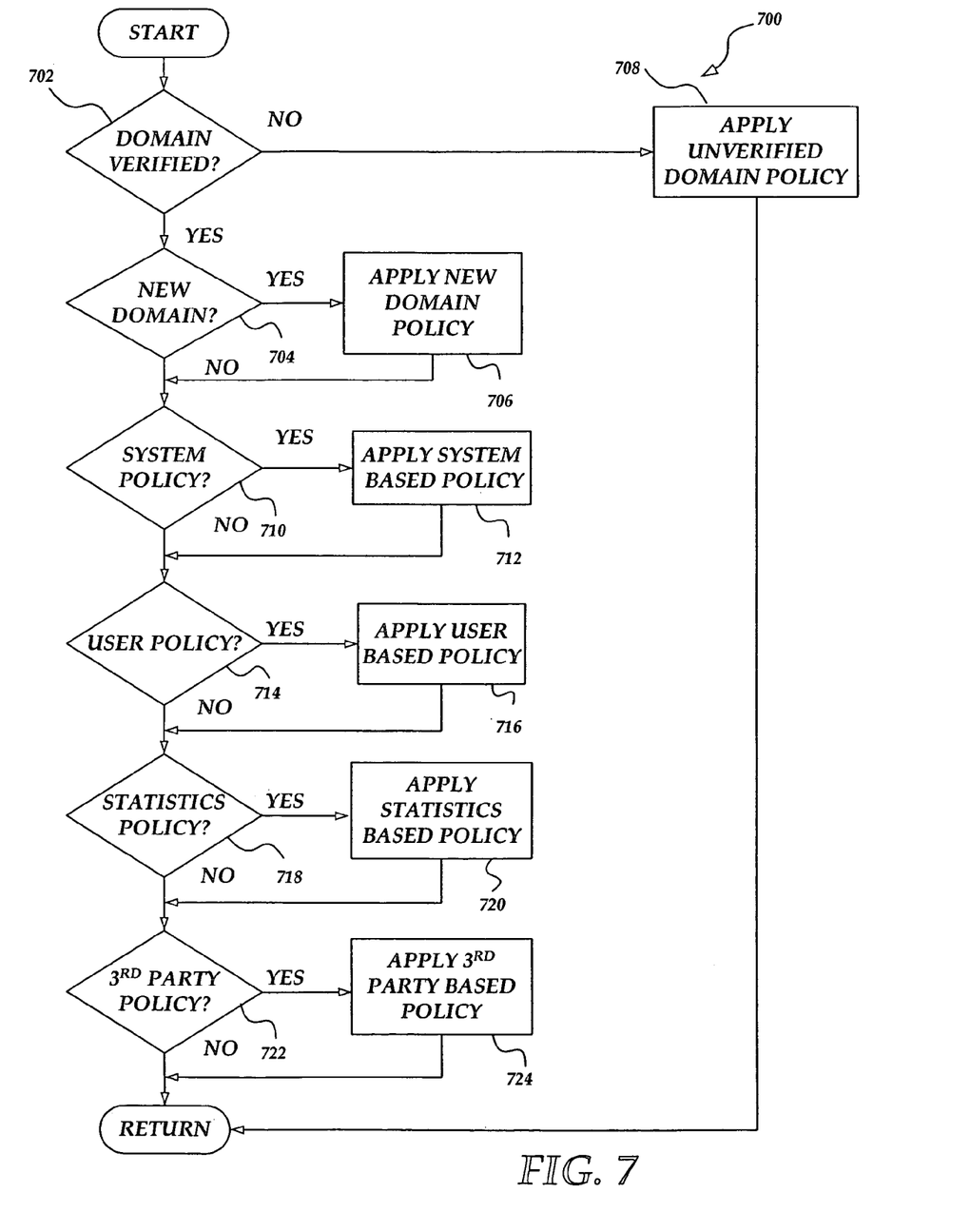
FIG. 7 illustrates a flow chart for employing different policies to handle a message for a recipient in accordance with the invention.

FIG. 7 is a flow chart showing an overview 700 of policies that can be applied to a message that originated from a verified or unverified domain. Moving from a start block, the process advances to decision block 702 where a determination is made as to whether the domain associated with the message can be verified as discussed above. If true, the process would advance to decision block 704 where a determination would be made as to whether the verified domain is a new domain to the message system. Furthermore, a verified domain policy (if any) could be applied for handling the received message. The policy for the message from the verified domain could include but not limited to, complete acceptance, complete rejection, preferential acceptance partial rejection/acceptance.

Additionally, if the determination at decision block 704 is affirmative, the process advances to block 706 where a new domain policy (if any) could be applied for handling the received message from a new domain. The policy for the message from the new domain could include, but not limited to, complete acceptance, complete rejection, preferential acceptance, and partial rejection/acceptance.

In one embodiment, a new domain policy would cause messages from a verified but new domain to be treated suspiciously at first. For example, the first 100 emails received in a predetermined period of time (such as 24 hours or less) could be completely accepted, and any other messages above the initial 100 would be partially rejected/accepted or completely rejected. In another embodiment, a new domain policy could enable 100 users to receive messages from the new domain with complete acceptance. Subsequently, these 100 users would be asked to vote and advise if any of the messages received from the new domain were spam. In another embodiment, a visual indication (text, graphic, color, and the like) could be applied to the display of a message from a new domain. In still another embodiment, new domain messages could be kept in a separate folder for a limited period of time. Additionally, a user's inbox could be automatically segmented to create the separate folder, category, and the like, for at least temporarily storing new domain messages.

Next, the process moves to decision block 710 where another determination is made as to whether a system wide policy applies to the message from a verified domain. Similarly, if the determination at decision block 704 had been false (no new domain), the process would have advanced to decision block 710 from decision block 704. If the determination at decision block 710 is true, the process advances to block 712 where a system based policy (if any) can be applied to the handling of the message that originated from a verified domain.

In one embodiment, a message system could apply a system wide policy where all messages from a particular domain that is associated with a business competitor would be diverted to an inbox for the user's manager. In another embodiment, each message from a particular domain would be treated as spam. In other embodiments, received messages from verified domains could be rejected/accepted in different ways by a policy, including, but not limited to, a complete rejection, complete acceptance, preferential acceptance, and partial rejection/acceptance. A complete rejection policy could be at least partially linked to a black list and a complete acceptance policy could be at least partially indicated in a white list. For preferential acceptance, a "gold" star, "plus" sign, "happy face", or some other substantially similar positive indication could be associated with a message for a user. Also, for complete acceptance and partial acceptance, other positive indications could be visually displayed. Similarly, for complete rejection and partial rejection of a message, a negative indication could be associated with the message and visually displayed for the user.

In another embodiment, partial acceptance/rejection messages could be kept in a separate folder such as a bulk folder for a limited period of time and then deleted. In still another embodiment, a user's inbox could be automatically segmented to create separate categories, folders, and the like, for at least temporarily storing messages in accordance with different policies for rejecting/accepting the messages.

Next, the process advances to decision block 714 where a determination is made as to whether a user has configured a policy for handling messages from the verified domain. Similarly, if the determination at decision block 710 had been false, the process would have flowed to decision block 714 from decision block 710. If the determination at decision block 714 is true, the process flows to block 716 where a user based policy (if any) can be applied in a manner substantially similar as discussed above in regard to complete acceptance, rejection, preferential acceptance, and partial rejection/acceptance.

Next, the process advances to decision block 718 where a determination is made as to whether a statistics based policy has been configured for handling messages from the verified domain. Similarly, if the determination at decision block 714 had been false, the process would have flowed to decision block 718 from decision block 714. If the determination at decision block 718 is true, the process advances to block 720 where statistics based policies (if any) can be applied in a manner substantially similar as discussed above in regard to complete acceptance, rejection, preferential acceptance, and partial rejection/acceptance.

In one embodiment, a statistics based policy can be based on historical trends of good/bad behavior for messages originating from a verified domain. For example, if a verified domain had a long term trend of good behavior (no spam), a statistics based policy might take longer to change from full acceptance to partial acceptance for the long term domain than another verified domain with a shorter term of good behavior. In another embodiment, the statistics based policy can be based on a change in a historical trend of good and bad behavior for messages originating from a verified domain. For example, if a verified domain is trending in the wrong direction of bad behavior (spam is originating from the verified domain), a policy of acceptance for the verified domain can be changed to partial rejection until the trend moves in the correct direction (no complaints about spam originating from the verified domain). In another embodiment, the statistical scores for each message sender is based at least in part on mean, mode, linear distribution, Gaussian distribution, and the like.

Next, the process advances to decision block 722 where a determination is made as to whether a third party based policy has been configured for handling messages from the verified domain. Similarly, if the determination at decision block 718 had been false, the process would have flowed to decision block 722 from decision block 718. If the determination at decision block 722 is true, the process advances to block 724 where third party based policies (if any) can be applied in a manner substantially similar as discussed above in regard to complete acceptance, rejection, preferential acceptance, and partial rejection/acceptance.

In one embodiment, a third party policy server could aggregate message information from different message systems regarding the good/bad behavior of a verified domain and provide the different message systems with scores for implementing suggested policies for handling subsequent messages that originate from the verified domain. Although the different message systems could operate in different organizations, they could subscribe to the third party policy server to receive the aggregated scores for messages originating at verified domains. A message system might subscribe to a third party policy server to enable a more complete analysis of good/bad behavior by domains that send relatively few messages to users of the message system.

Next the process advances to a return block and returns to performing other actions. Similarly, if the determination at decision block 722 had been false, the process would have advanced to the return block.

Alternatively, if the domain name is not verified at decision block 702, the process would advance to block 708 where a policy (if any) could be applied to the handling of the message from the unverified domain in a manner substantially similar as discussed above in regard to complete acceptance, rejection, preferential acceptance, and partial rejection/acceptance. In one embodiment, a policy would cause the message that originated from the unverified domain to be completely rejected. In another embodiment, a policy would cause the message from the unverified domain to be at least partially rejected. Next, the process advances to the return block and returns to performing other actions.

Domain Key Based Personal Certificate

Once domain keys are used in a messaging system, other applications are enabled. For example, with the Domain Key application in operation, for say foo.com, a domain administrator can use the domain key pairs to create and sign a personal certificate just for thomas@foo.com. This personal certificate is a representation of a Public/Private Key pair that is signed by some other Public/Private Key pair, and in this case the signing pairs are the one associated with the domain key pairs.

Relatively standard public key cryptography can enable a user to employ this personal certificate to digitally sign messages, e.g., email, IM, and chat traffic. At the receiving end of the messages, the recipient fetches the domain key pairs for the domain (foo.com) and they can prove that the sender (and sender's messages) are who they claim to be, namely thomas@foo.com. Most all of this digital signing and proving can happen under the covers, so that a user employs a messaging client in the usual way.

To get the personal certificate onto a messaging client, a modification can be made to the protocol that the client uses to fetch messages such that the messaging server also sends back the user's personal certificate. In this way, the messaging client would have a copy of the personal certificate and can make it available to other messaging programs.

Once the messaging client has the personal certificate, it can send the public part of that certificate to anyone it sends messages to (or chats to for that matter). The next time a message is sent, the recipient gets message plus the Public part of the personal certificate. Using the foo.com Domain-Key application in the DNS, the recipients messaging system can prove that that the personal certificate has been issued by foo.com to the sender's message address. The various proving and acceptance processes can happen automatically so that the sender and the recipient do not have to be made aware that the personal certificate was issued, proven, and authenticated.

Additionally, the recipient's messaging client can store the sender's personal certificate in an address book for later use in encrypting messages to the sender. For example, by using the public part of the personal certificate, a subsequent reply can be encrypted in such a way that only the original sender can decrypt the response. In other words, only the public key part of a user's personal certificate can be used to encrypt messages that only the user can decrypt with the private key part of the user's personal certificate. Also, during this process, the original recipient can send the public part of their personal certificate to the original sender so that subsequent replies by the original sender can be encrypted for viewing by the original recipient.

It is important to note that the issuance of personal certificates to users of a domain and the exchange of the public parts of personal certificates can occur between co-operating applications without any intervention by the users. The transparent segue into provable and encrypted data exchanges on a person to person basis is enabled by a relatively simplified method for accessing the key pair that signed a user's personal certificate, i.e., the domain key pair.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method for message authentication, comprising:
generating a key pair associated with a domain, wherein a public component of the key pair is accessible to a domain name system (DNS) server that is associated with the domain;
if a message originates from a sender's address associated with the domain, employing a private component of the key pair to digitally sign the message and forwarding the digitally signed message towards a recipient of the message; and
if the public component stored with the DNS server verifies that the digitally signed message originated from the domain associated with the sender's address, employing at least one policy associated with the originating domain to handle the verified digitally signed message for the recipient;
else handling the message from another sender's address associated with an unverified domain.

2. The method of claim 1, wherein employing at least one policy, further comprises employing an unverified policy to handle each message for the recipient that originates from the sender's domain that is unverifiable, wherein the unverified policy enables at least one action including partial rejection, and complete rejection.

3. The method of claim 1, wherein employing at least one policy, further comprises employing a verified policy to handle each verified digitally signed message for the recipient that originates from the verified domain of the sender, wherein the verified policy enables at least one action including complete acceptance, complete rejection, preferential acceptance, partial rejection, and partial acceptance.

4. The method of claim 1, wherein employing at least one policy, further comprises employing a system policy to handle each verified digitally signed message for each recipient in a message system, wherein the system policy enables at least one action for each recipient in the message system including complete acceptance, complete rejection, preferential acceptance, partial acceptance, and partial rejection.

5. The method of claim 1, wherein employing at least one policy, further comprises employing a user policy for a particular recipient to handle the verified digitally signed message, wherein the user policy enables at least one action for the particular recipient including complete acceptance, complete rejection, preferential acceptance, partial acceptance, and partial rejection.

6. The method of claim 1, wherein employing at least one policy, further comprises employing a third party to provide a score for a particular domain to a message system for determining a score policy on handling each verified digitally signed message that originates from the scored domain, wherein the score policy enables at least one action including complete acceptance, complete rejection, preferential acceptance, partial acceptance, and partial rejection.

7. The method of claim 6, wherein the third party aggregates information from at least one recipient in a plurality of message systems for determining the score for the domain.

8. The method of claim 6, further comprising enabling the third party to provide a suggested score policy for handling each verified digitally signed message from the scored domain based at least in part on the aggregated information, wherein the suggested scored policy enables at least one action including complete acceptance, complete rejection, preferential acceptance, partial acceptance, and partial rejection.

9. The method of claim 1, wherein employing at least one policy, further comprises employing a statistics policy based on at least one statistic regarding a plurality of verified digitally signed messages that have previously originated from the verified domain, wherein the statistics policy enables the handling of each message that originates from the previously verified domain, and wherein the statistics policy enables at least one action including complete acceptance, complete rejection, preferential acceptance, partial acceptance, and partial rejection.

10. The method of claim 9, further comprising determining a trend for messaging behavior in regard to a plurality of messages originating from the domain over a period of time.

11. The method of claim 10, if the trend is determined to represent negative messaging behavior for the domain, employing at least a length of the trend to enable a change in at least one policy associated with the handling of verified digitally signed message for the recipient.

12. The method of claim 10, if the trend is determined to represent positive messaging behavior for the domain, employing at least a length of the trend to enable a change in at least one policy associated with the handling of verified digitally signed message for the recipient.

13. The method of claim 1, further comprising displaying a positive visual indication of at least one action, including complete acceptance, preferential acceptance, and partial acceptance of the verified digitally signed message, wherein the positive indication includes at least one of text, graphic, picture, and color.

14. The method of claim 1, further comprising displaying a negative visual indication of at least one action, including complete rejection, and partial rejection of the verified digitally signed message wherein the negative indication includes at least one of text, graphic, picture, and color.

15. The method of claim 1, further comprising automatically segmenting an inbox to at least temporarily store each verified digitally signed message in accordance with the at least one policy that enables at least one action, including complete rejection, complete acceptance, preferred acceptance, partial rejection, and partial acceptance.

16. The method of claim 1, wherein employing at least one policy, further comprises if it is determined that the domain is relatively new to a messaging system, employing a new domain policy for handling an amount of verified digitally signed messages that are less than a predetermined limit over a period of time, wherein each message less than the predetermined limit is handled with at least partial acceptance.

17. The method of claim 1, wherein employing the policy, further comprises if it is determined that the domain is relatively new to a messaging system, employing a new domain policy for handling an amount of verified digitally signed messages that are less than a predetermined limit over a period of time, wherein each message that is greater than the predetermined limit is handled with at most partial rejection.

18. The method of claim 1, further comprising
generating a personal digital certificate for the sender based on the public component and the private component of the key pair associated with the domain;
providing a public component of the personal digital certificate to the recipient along with the verified digitally signed message; and
enabling the recipient to subsequently provide a response message to the sender that is automatically encrypted with the public component of the sender's personal digital certificate.

19. The method of claim 18, wherein the personal digital certificate is associated with an address of the sender.

20. A server for message authentication, comprising:
a memory for storing instructions;
a processor for enabling actions based on the stored instructions, including:
generating a key pair associated with a domain, wherein a public component of the key pair is accessible to a domain name system (DNS) server that is associated with the domain;
if a message originates from a sender's address associated with the domain, employing a private component of the key pair to digitally sign the message and forwarding the digitally signed message towards a recipient of the message; and
if the public component stored with the DNS server verifies that the digitally signed message originated from the domain associated with the sender's address, employing at least one policy associated with the originating domain to handle the verified digitally signed message for the recipient;
else handling the message from another sender's address associated with an unverified domain.

21. The server of claim 20, wherein the at least one policy includes at least one of an unverified domain policy, a verified domain policy, a new domain policy, a system policy, a user policy, a statistics policy, and a third party policy.

22. The server of claim 20, the actions further comprising:
generating a personal digital certificate for the sender based on the public component and the private component of the key pair associated with the domain, wherein the personal digital certificate is associated with an address of the sender;
providing a public component of the personal digital certificate to the recipient along with the verified digitally signed message; and
enabling the recipient to subsequently provide a response message to the sender that is automatically encrypted with the public component of the sender's personal digital certificate.

23. A client for message authentication, comprising:
a memory for storing instructions;
a processor for enabling actions based on the stored instructions, including:
generating a key pair associated with a domain, wherein a public component of the key pair is accessible to a domain name system (DNS) server that is associated with the domain;
if a message originates from a sender's address associated with the domain, employing a private component of the key pair to digitally sign the message and forwarding the digitally signed message towards a recipient of the message; and
if the public component stored with the DNS server verifies that the digitally signed message originated from the domain associated with the sender's address, employing at least one policy associated with the originating domain to handle the verified digitally signed message for the recipient;
else handling the message from another sender's address associated with an unverified domain.

24. The client of claim 23, wherein the at least one policy includes at least one of an unverified domain policy, a verified domain policy, a new domain policy, a system policy, a user policy, a statistics policy, and a third party policy.

25. The client of claim 23, the actions further comprising:
generating a personal digital certificate for the sender based on the public component and the private component of the key pair associated with the domain, wherein the personal digital certificate is associated with an address of the sender;
providing a public component of the personal digital certificate to the recipient along with the verified digitally signed message; and
enabling the recipient to subsequently provide a response message to the sender that is automatically encrypted with the public component of the sender's personal digital certificate.

26. A computer readable storage medium that includes instructions for performing actions, comprising:
generating a key pair associated with a domain, wherein a public component of the key pair is accessible to a domain name system (DNS) server that is associated with the domain;
if a message originates from a sender's address associated with the domain, employing a private component of the key pair to digitally sign the message and forwarding the digitally signed message towards a recipient of the message; and
if the public component stored with the DNS server verifies that the digitally signed message originated from the domain associated with the sender's address, employing at least one policy associated with the originating domain to handle the verified digitally signed message for the recipient;
else handling the message from another sender's address associated with an unverified domain.

27. The computer readable storage medium of claim 26, the actions further comprising:
generating a personal digital certificate for the sender based on the public component and the private component of the key pair associated with the domain, wherein the personal digital certificate is associated with an address of the sender;
providing a public component of the personal digital certificate to the recipient along with the verified digitally signed message; and
enabling the recipient to subsequently provide a response message to the sender that is automatically encrypted with the public component of the sender's personal digital certificate.

28. An apparatus for message authentication, comprising:
- a means for generating a key pair associated with a domain, wherein a public component of the key pair is accessible to a domain name system (DNS) server that is associated with the domain;
- a means for employing a private component of the key pair to digitally sign the message and forwarding the digitally signed message towards a recipient of the message if a message originates from a sender's address associated with the domain; and
- a means for employing at least one policy associated with the originating domain to handle the verified digitally signed message for the recipient if the public component stored with the DNS server verifies that the digitally signed message originated from the domain associated with the sender's address;
- else a means for handling the message from another sender's address associated with an unverified domain.

* * * * *

UNITED STATES PATENT AND TRADEMARK OFFICE
CERTIFICATE OF CORRECTION

PATENT NO. : 7,313,700 B2  
APPLICATION NO. : 10/805181  
DATED : December 25, 2007  
INVENTOR(S) : Delany Page 1 of 1

It is certified that error appears in the above-identified patent and that said Letters Patent is hereby corrected as shown below:

In column 7, line 20, delete "Signature: "header" and insert -- Signature:" header --, therefor.

In column 7, line 27, before "DomainKey-Signature:" insert -- " --.

In column 7, line 61, delete "19rOUi4" and insert -- 19r0Ui4 --, therefor.

In column 7, line 61, delete "3NOq" and insert -- 3N0q --, therefor.

In column 8, line 13, below "Hi." delete ".etc" and insert -- ..etc --, therefor.

In column 17, line 9, in Claim 18, after "comprising" insert -- : --.

Signed and Sealed this

Twenty-ninth Day of April, 2008

JON W. DUDAS  
*Director of the United States Patent and Trademark Office*